United States Patent Office 3,289,916
Patented Dec. 6, 1966

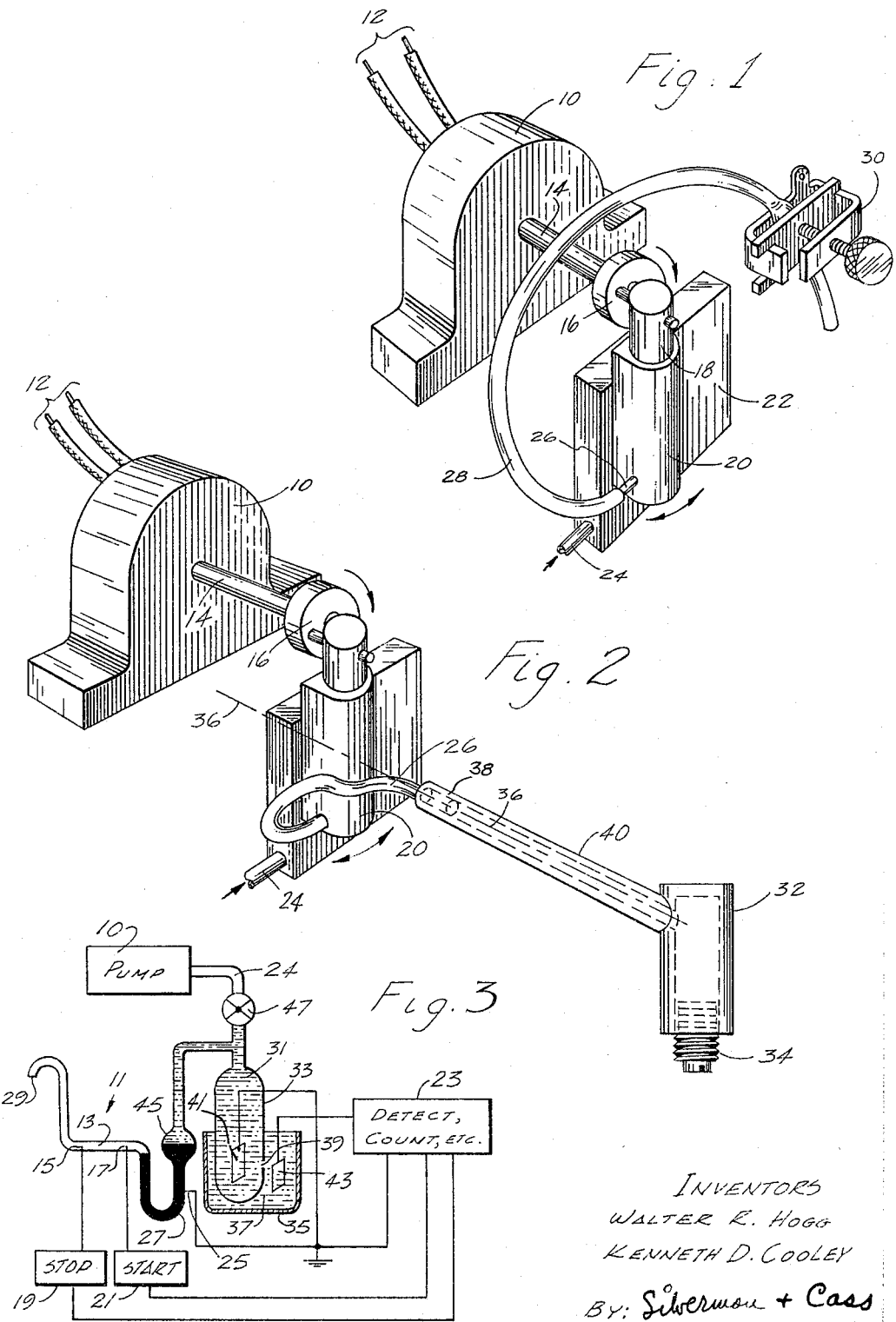

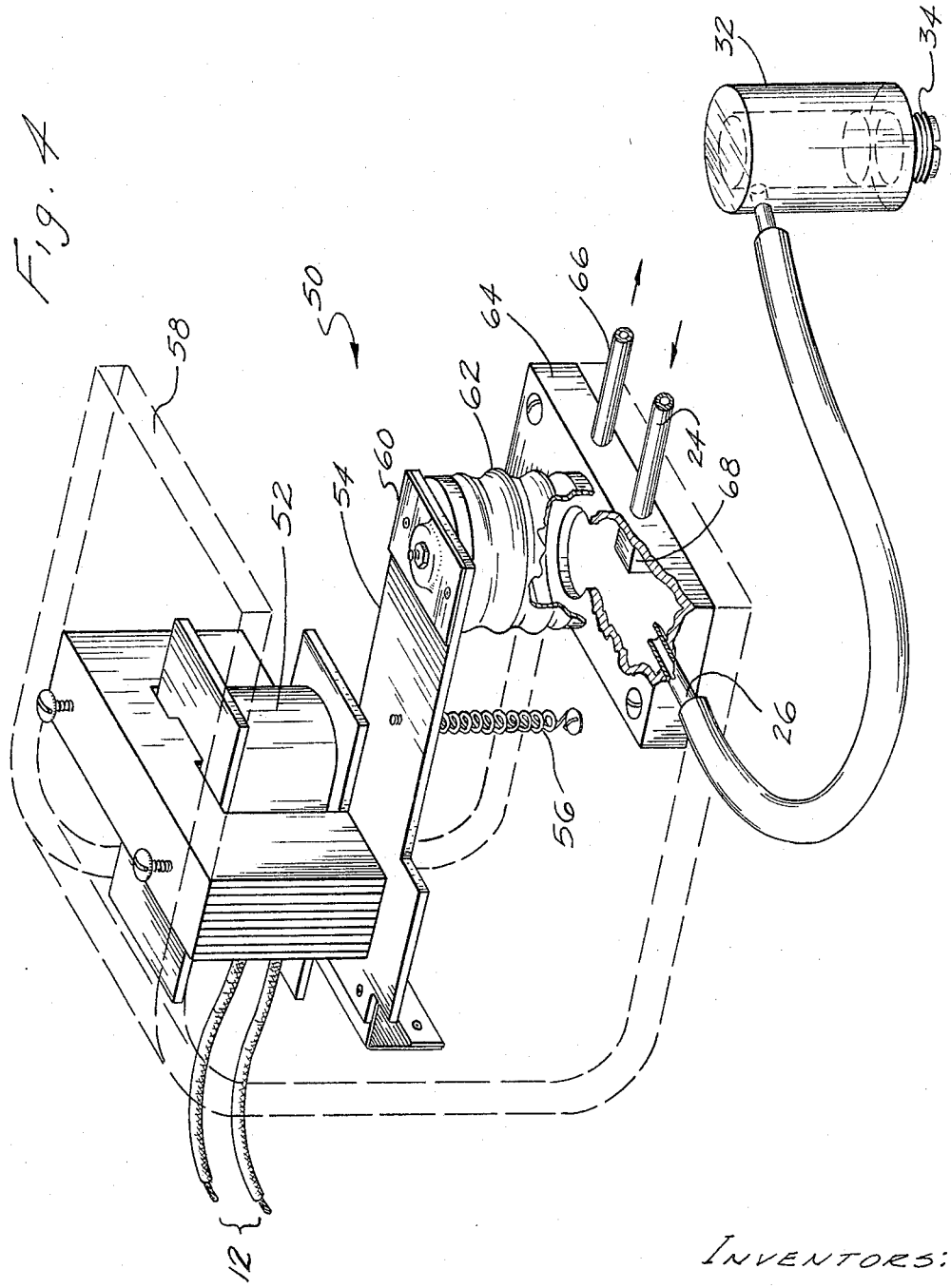

3,289,916
VARIABLE PRESSURE PUMP FOR MANOMETRIC METERING DEVICE
Walter R. Hogg, Hialeah, and Kenneth D. Cooley, Fort Lauderdale, Fla., assignors to Coulter Electronics, Inc., Hialeah, Fla., a corporation of Illinois
Filed Nov. 16, 1964, Ser. No. 411,532
5 Claims. (Cl. 230—21)

This invention relates generally to small capacity pumps and more particularly is concerned with a pump for applying vacuum to a manometric metering device.

In Coulter U.S. Patent 2,869,078 issued January 13, 1959 to Wallace H. Coulter and Joseph R. Coulter Jr., and entitled "Fluid Metering Apparatus," there is described a manometric metering device which is intended for the purpose of metering flow of a suspension of particles through an aperture while signals are produced as a result of changes in the impedance of the effective volume of the suspension electrolyte included in the aperture, occasioned by the presence of the passing particles. The basic principal of counting and sizing particles is disclosed in this manner in U.S. Patent 2,656,508 issued October 20, 1953 to Wallace H. Coulter and entitled "Means for Counting Particles Suspended in a Fluid." Both of the patents above mentioned, as well as the application herein, are assigned to the same assignee.

In the course of using the manometric metering device, a conduit which has the usual manometric configuration including a metering zone and a bend, is connected with a closed fluid system including one vessel into which it is desired to draw the suspension through an aperture in the side of the vessel from a second vessel in which the first is immersed. The second end of the conduit is open to the atmosphere. In the closed fluid system there is an outlet from the first vessel which is connected with a source of vacuum by way of an manual valve. The manometric fluid comprises a column of mercury which is much heavier than the electrolyte that contains the particles being examined or at least is heavier than the fluid contained in the first vessel above described.

When the user wishes to operate the device, he opens the valve to the external source vacuum and draws the mercury inwardly relative to the atmospheric end of the conduit for a short distance. The mercury column is thereby unbalanced in the manometer since the aperture is very much smaller in cross section than the cross section of mercury column. In any event the flow rate through the aperture is smaller than the capacity of the pump. Most of the atmospheric pressure applied to the closed fluid system will be applied through the open end of the manometric device causing this movement of the mercury.

The manometer is designed so that the mercury will move to its unbalanced position far enough to uncover two electrodes, the same being stop and start electrodes in the metering zone, which is carefully calibrated as to its subtended volume. A third electrode is in continuous contact with the mercury as a common or ground electrode. After unbalancing the mercury, the operator closes the valve leading to the vacuum source, so that the mercury will be permitted to drop to its balanced condition. As the mercury slowly drops, since it is in fluid pressure contact with the closed fluid system, it will draw suspension by way of the aperture into the first vessel. Electrodes in this vessel as well as in the outer second vessel in which the first is immersed, produces the necessary signals as described in the above patents.

As the mercury passes the two electrodes defining the metering zone, it starts and then stops the counting apparatus electrically, thereby giving an accurate numerical count of the particles in a defined volume of the suspension drawn through the aperture.

Small electrical pumps are used to produce the vacuum and a problem which is solved by the invention herein is controlling the height to which the mercury column is drawn during its unbalancing movement. If the height is insufficient, the metering zone electrodes will not be fully uncovered. If the column is drawn too far, the mercury may spill into one of the fluid vessels requiring eventual disassembly and cleaning of the apparatus and sometimes requiring replacement of the mercury.

Although the difficulty of applying to much vacuum and withdrawing the mercury too far has been overcome for the most part by the presence of a diaphragm type vacuum regulator and additional problems involving air bubbles have been overcome by the use of a coalescing bulb in the lower bend of the manometer, perhaps an equally important benefit to be obtained by careful regulation of the pump is to prevent the mercury from being drawn too far past the metering zone thus requiring the mercury to retrace this path upon initiation of a count cycle. A considerable amount of time is lost in such case during which no counting is done while the mercury passes through the conduit on its way to the metering zone.

The ideal situation would be for the user to open the valve connected with the vacuum source and have the mercury move in the conduit to a point just inside the boundaries of metering zone so that when the valve is closed, the return of the mercury to its balanced position will require very little movement in the conduit not included in the metering zone. The word "inside" means on the side of the metering zone opposite the atmospheric end.

The invention herein has as its principal object the provision of simple and effective means to enable the user to adjust and control the pressure or vacuum to be obtained from the vacuum pump so that he may adjust the pressure for the particular apparatus used so that when the valve is opened, the mercury will move to a predetermined point of the manometer.

Other objects will become apparent as the disclosure of the invention proceeds in connection with which two embodiments are described and illustrated in order to obtain a full understanding of the invention.

In the drawings:
FIGS. 1 and 2 are perspective generally diagrammatic views showing preferred embodiments of the invention.
FIG. 3 is a diagrammatic view of the metering device associated with a pump of FIGS. 1 or 2.
FIG. 4 is a perspective view showing the application of the principles of the invention to a bellows type pump.

The pump almost universally used with Coulter apparatus consists of a small electric motor driving a piston in a pump cylinder which is mounted for oscillation on a ported block. There are valving ports opened and closed by the rocking of the cylinder and a small conduit or tube connects from the block to the valve of the closed fluid system. In accordance with the invention, there is a volumetric extension of the cylinder which is external to the cylinder but connected thereto, that can easily be adjusted by the user.

Referring now to the drawing in which the same characters of reference are used to designate the same parts:

In FIG. 3 a system using the invention is illustrated. The manometer 11 is formed of capillary tubing comprising a metering zone 13 of precise volume defined between START electrode 15 and STOP electrode 17 which operate through suitable circuitry at 19 and 21 respectively to start or stop the counters of the apparatus 23. This latter apparatus includes amplifiers, pulse shapers, display devices, counters, etc. The third or ground electrode is shown at 25, contacting the mercury column 27. One end 29 of the manometer 11 opens to the atmosphere and the other end is connected to the closed fluid system 31 inside the Coulter aperture tube 33 immersed in the second vessel 35. The sample suspension 37 is to pass through aperture 39 into the first vessel 33 to produce signals across electrodes 41 and 43 suitably coupled to the detector 23. The reservoir 45 is in the conduit above the metering zone 13. The valve 47 connects the closed fluid system in the apparatus with the vacuum pump 10 by the conduit 24.

Opening the valve 47 will move the column 27 to the right of the electrode 17, out of the metering zone 13. The most favorable position is as shown in FIG. 3 or perhaps just entering the lower bend. Closing the valve will permit the mercury to recede toward the left, filling the metering zone, drawing the fluid 37 through the aperture 39 and starting and stopping the counters.

In FIG. 1 the pump motor 10 is energized from a suitable source of power by the leads 12, has a shaft 14 driving an eccentric 16 that reciprocates the piston 18 within the cylinder 20. The cylinder is mounted to rock on the block 22 which has valving ports that are opened and closed by the rocking of the cylinder as the piston oscillates. This is a common and well known structure which need not be described. The conduit 24 which connects with the outlet port in the valve block is extended to the closed fluid system described and illustrated in FIG. 3 and has the manually operable valve 47 in it.

FIG. 2 is identical to FIG. 1 as thus far described.

Referring once more to FIG. 1, a small piece of metal tubing 26 is fixed into the cylinder at a portion thereof which clears the stroke of the piston 18. This portion is called the cylinder clearance volume. A conduit 28 of plastic, rubber or rubber-like material is connected from the tube 26 to a simple tubing pinch clamp 30 that can be adjusted as to its position upon the tube 28. Since the cylinder clearance volume is extended by the tube 26 and the length of tubing 28, and since the clamp may be moved to any location along the length of tubing 28, the total or effective volume of the pump may be varied, thereby varying the vacuum or pressure exerted by way of the conduit.

This behavior follows from the fact that, during adiabatic expansion or compression of a gas in the pump, the product of pressure and volume raised to a constant power is a constant. In other words $$P_1(V_1)^K = P_2(V_2)^K$$

or $$\frac{P_1}{P_2} = \left(\frac{(V_2)}{(V_1)}\right)^K$$

where $P_1$ and $P_2$ are the pressures before and after expansion; $(V_1)$ and $(V_2)$ are the volumes before and after expansion; and K is a constant, usually equal to approximately 1.3 in pumps handling gas. Thus, it is apparent that by regulating $V_2/V_1$, the compression ratio, it is feasible to effect a regulation of $P_1/P_2$, the pressure ratio between the inlet and outlet of the pump.

The structure is easily understood from the drawing. The material from which the length of tubing 28 is made may be stiff or flexible. Even if that length of tubing collapses during the strokes of the piston, it can still furnish a regulation or adjustment of the vacuum produced. If it is stiff enough to remain in an uncollapsed condition it will, in effect, increase the clearance volume of the cylinder and cause the mechanism to behave in a predictable fashion according to laws of expansion of gases. The tubing clamp has the usual thumb-screw as shown to enable the necessary adjustment.

The structure of FIG. 2 differs from that of FIG. 1 only in regard to the extension of the cylinder clearance volume. The tubing member 26 which is connected to the cylinder 20 extends by way of a duct 40 to a metal or other container 32 whose volume may be adjusted by suitable screw plug 34. A telescoping sleeve joint which is pressure tight is provided by any suitable technique at the point 37 where the tubing 26 engages in the duct 40. Since the cylinder 20 oscillates during operation of the device, and if it is assumed that the piece of tubing 26 is of metal, relative movement between the duct 40 and the tubing 26 is accommodated by mounting the duct so that it is coaxial with the rocking center of the cylinder 20. The axis of rocking of the cylinder 20 is designated 36 by broken lines.

It will be noted that the tube 40 may well be the shaft upon which the cylinder 20 rocks and hence may extend on into the cylinder and block, be suitably journalled in the cylinder and have an internal connection therewith.

FIG. 4 shows the application of the invention to another common type of pump which may be used with a Coulter apparatus. Pump 50 comprises a vibrator type of electromagnetic motor 52 driving an armature 54 against spring 56 secured to the frame 58. The motor 52 is energized from a source of alternating voltage by way of the electrical leads 12. The free end of the armature 54 is secured at 60 to the bellows 62. The bellows 62 operate into a pump box 64. Inlet line 24 and outlet line 66 have check valves such as shown at 68 to enable the bellows 62 to be filled on the expansion stroke and to be forced through the outlet on the compression stroke, producing a pumping action and hence a vacuum in the line 24.

Regulation of pressure is achieved by means of a conduit 26 which communicates with the pump box 64 between the check valves leading to an external variable volume vessel. The tube 40 may be flexible and extends to vessel 32 having a variable plug 34.

In use, the position of the mercury volume 27 upon opening the valve 47 and leaving it open, is adjusted by the location of the pinch clamp 30 or the amount of plug 34 screwed into the container 32.

It should be apparent that variations may be made without in any way departing from the spirit or scope of the invention, as defined in the attached claims.

What it is desired to secure by Letters Patent of the United States is:

1. In a small capacity vacuum pump of the fluid compression type for use in applying vacuum to a manometric metering device wherein said pump includes a vessel for containing the fluid to be compressed, said vessel having a clearance volume and also communicating with a hollow ported block and check valve means included within the block at each port constructed and arranged alternatively to open and to close serially, and a first conduit member communicating with the interior of the block and leading to said manometric metering device; the improvement consisting of means defining a volumetric extension of the clearance volume of said vessel comprising, a second conduit member secured at one end to the vessel at the vicinity of the clearance volume and communicating thereto, an elongate tubing member having a flexible portion connected with the other end of said second conduit and leading therefrom to a location remote from said vessel, means for closing the other end of said tubing at said remote location, and, means for reducing selectively the effective internal volume of said tubing a predetermined amount to vary the effective volume of said extension within defined limits thereby to vary the compression ratio of the pump and in that manner, vary the percentage vacuum output thereof delivered to the manometric metering device.

2. The structure as claimed in claim 1 in which said vessel is a cylinder and a piston reciprocates within said cylinder, the clearance volume being located at the end of the cylinder and said second conduit member is disposed through the cylinder wall to communicate to the clearance volume.

3. The structure as claimed in claim 1 in which said elongatae tubing member comprises a hollow duct terminating in a hollow container, said container having an open mouth and a plug disposed therein to close off said mouth, the depth of entry of said plug in said container being variable within known limits whereby to determine the effective volume of the duct and container.

4. The structure as claimed in claim 3 in which the second conduit is joined to said duct by means of a telescoping sleeve joint.

5. A small capacity vacuum pump of the type utilizing an assembly comprising a member reciprocating within a first vessel and the vessel having a clearance volume, said assembly having an external vessel connected with the clearance volume as an extension thereof and means for varying the volume of the external vessel, said pump including a cylinder, a shaft for mounting the cylinder, said cylinder arranged to rock on said shaft, and the member comprises a pump piston arranged to reciprocate in the cylinder, a conduit connecting the external vessel to the cylinder, said conduit being contained by the shaft and being coaxial with the axis of rocking of the cylinder.

References Cited by the Examiner
UNITED STATES PATENTS

| | | | |
|---|---|---|---|
| 419,916 | 1/1890 | Blount | 230—21 |
| 1,099,457 | 6/1914 | Longacre | 230—21 |
| 1,394,835 | 10/1921 | Hunt | 230—21 |
| 2,038,577 | 4/1936 | Kuhl | 230—21 |
| 2,241,195 | 5/1941 | Gehres | 230—21 |
| 2,656,508 | 10/1953 | Coulter | 324—30 |
| 2,869,078 | 1/1959 | Coulter et al. | 324—30 |

DONLEY J. STOCKING, *Primary Examiner.*

MARK M. NEWMAN, *Examiner.*

W. J. KRAUSS, *Assistant Examiner.*